(12) United States Patent
Thompson

(10) Patent No.: US 11,776,293 B2
(45) Date of Patent: *Oct. 3, 2023

(54) SYSTEM AND METHOD FOR INCREASING SAFETY DURING LAW ENFORCEMENT STOPS

(71) Applicant: Daniel Thompson, San Jose, CA (US)

(72) Inventor: Daniel Thompson, San Jose, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 17/740,767

(22) Filed: May 10, 2022

(65) Prior Publication Data
US 2022/0270389 A1 Aug. 25, 2022

Related U.S. Application Data

(63) Continuation of application No. 16/953,326, filed on Nov. 19, 2020, now Pat. No. 11,328,526, which is a continuation-in-part of application No. 16/588,004, filed on Sep. 30, 2019, now Pat. No. 10,943,104, which is a continuation of application No. 16/137,347, filed on Sep. 20, 2018, now abandoned.

(60) Provisional application No. 62/562,225, filed on Sep. 22, 2017.

(51) Int. Cl.
| | |
|---|---|
| *G06V 40/10* | (2022.01) |
| *G08G 1/09* | (2006.01) |
| *G08G 1/01* | (2006.01) |
| *G08G 1/0967* | (2006.01) |
| *G08G 1/0965* | (2006.01) |
| *G08G 1/017* | (2006.01) |
| *G06V 20/56* | (2022.01) |

(52) U.S. Cl.
CPC ............ *G06V 40/103* (2022.01); *G06V 20/56* (2022.01); *G08G 1/012* (2013.01); *G08G 1/017* (2013.01); *G08G 1/09* (2013.01); *G08G 1/0965* (2013.01); *G08G 1/096716* (2013.01); *G08G 1/096791* (2013.01)

(58) Field of Classification Search
CPC ........... G06K 9/00369; G06K 9/00791; G08G 1/012; G08G 1/017; G08G 1/09; G08G 1/0965; G08G 1/096716; G08G 1/096791
See application file for complete search history.

(56) References Cited

U.S. PATENT DOCUMENTS

| | | | |
|---|---|---|---|
| 6,437,690 B1 * | 8/2002 | Okezie | B60R 25/33 340/505 |
| 9,268,551 B2 * | 2/2016 | Marr | G06F 30/34 |
| 9,363,357 B2 * | 6/2016 | Hansen | G06V 20/56 |
| 9,418,491 B2 * | 8/2016 | Phillips | B60R 25/25 |
| 9,595,193 B1 * | 3/2017 | Duale | G08G 1/0116 |

(Continued)

*Primary Examiner* — Joseph H Feild
*Assistant Examiner* — Rufus C Point
(74) *Attorney, Agent, or Firm* — Christopher Pilling

(57) ABSTRACT

An improvement is provided for routine law enforcement stops by making it safer for police officers and pedestrians. Implementation of smart technology into the industry wide standard use of physical interactions between police officers and pedestrians, a streamed lined method and process will yield optimal results as a safer method and system in executing such a tactic. Utilizing technology i.e. algorithms and databases, servers, and cloud-based infrastructures with application processing interfaces (api's) communicating in this ecosystem, creating a synergy while transferring specific data; will replace the current process of a routine traffic stop.

7 Claims, 4 Drawing Sheets

(56) References Cited

U.S. PATENT DOCUMENTS

| | | | | |
|---|---|---|---|---|
| 10,121,370 B2* | 11/2018 | Elsheemy | | G08G 1/096775 |
| 10,205,915 B2* | 2/2019 | Araya | | H04N 9/802 |
| 10,248,379 B2* | 4/2019 | Steinberg | | G06Q 50/30 |
| 10,679,490 B2* | 6/2020 | Muppirala | | G06V 20/584 |
| 10,943,104 B2* | 3/2021 | Thompson | | G08G 1/09 |
| 11,093,597 B2* | 8/2021 | Pantfoerder | | H04W 12/50 |
| 11,328,526 B2* | 5/2022 | Thompson | | G08G 1/09 |
| 2013/0197945 A1* | 8/2013 | Anderson | | G06Q 10/10 |
| | | | | 705/4 |
| 2018/0338231 A1* | 11/2018 | Johnson | | G06V 40/172 |
| 2019/0164244 A1* | 5/2019 | Ghaffar | | G06Q 50/26 |

* cited by examiner

SYSTEM AND METHOD FOR INCREASING SAFETY DURING LAW ENFORCEMENT STOPS

CROSS-REFERENCE TO RELATED APPLICATIONS

The present application is a continuation of U.S. patent application Ser. No. 16/953,326 filed on Nov. 19, 2020, which is a continuation in part to serial number U.S. patent application Ser. No. 16/588,004 filed on Sep. 30, 2019, which is a continuation of Ser. No. 16/137,347 filed on Sep. 20, 2018, which claims priority to U.S. Provisional Patent Application Ser. No. 62/562,225, filed on Sep. 22, 2017 the disclosures of which are hereby incorporated in its entirety at least by reference.

BACKGROUND OF THE INVENTION

1. Field of the Invention

The present invention relates to a system and method for increasing safety during law enforcement stops.

2. Description of Related Art

Routine traffic stops are among the most dangerous police duties, according to reports in 2015, seven police offers were killed during traffic stops, which was the leading felonious cause of death among officers in 2015. Likewise, over 100 civilians were killed by police after a traffic stop in 2015. The combination of tense officers and anxious drivers means that traffic stops are often one miscalculation away from disaster. The 1$^{st}$ words from a Police Officers mouth when pulled over are: "License, Registration and Proof Insurance . . . " He's already ran the license plates after pulling the vehicle over . . . waiting for the results from his dispatch. This can be problematic for both officers and drivers in terms of safety. Consequently, a non-physical system and method to make routine traffic stops safer for police officers and drivers is disclosed.

BRIEF SUMMARY OF THE INVENTION

In one embodiment, a method is provided comprising steps: identifying a driver from a distance via application software during a routine traffic stop.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor for carrying out their invention. Various modifications, however, will remain readily apparent to those skilled in the art, since the general principles of the present invention have been defined herein to specifically provide a system and method for increasing safety during traffic stops.

In one embodiment, an improvement in routine traffic stops by making it safer for police officers and drivers is provided. Implementation of smart technology into the industry wide standard use of physical interactions between police officers and drivers, a streamed lined method and process will yield optimal results as a safer method and system in executing such a tactic. Utilizing technology i.e. algorithms and databases, servers, and cloud-based infrastructures with application processing interfaces (api's) communicating in this ecosystem, creating a synergy while transferring specific data; will replace the current process of a routine traffic stop.

Figure 1:
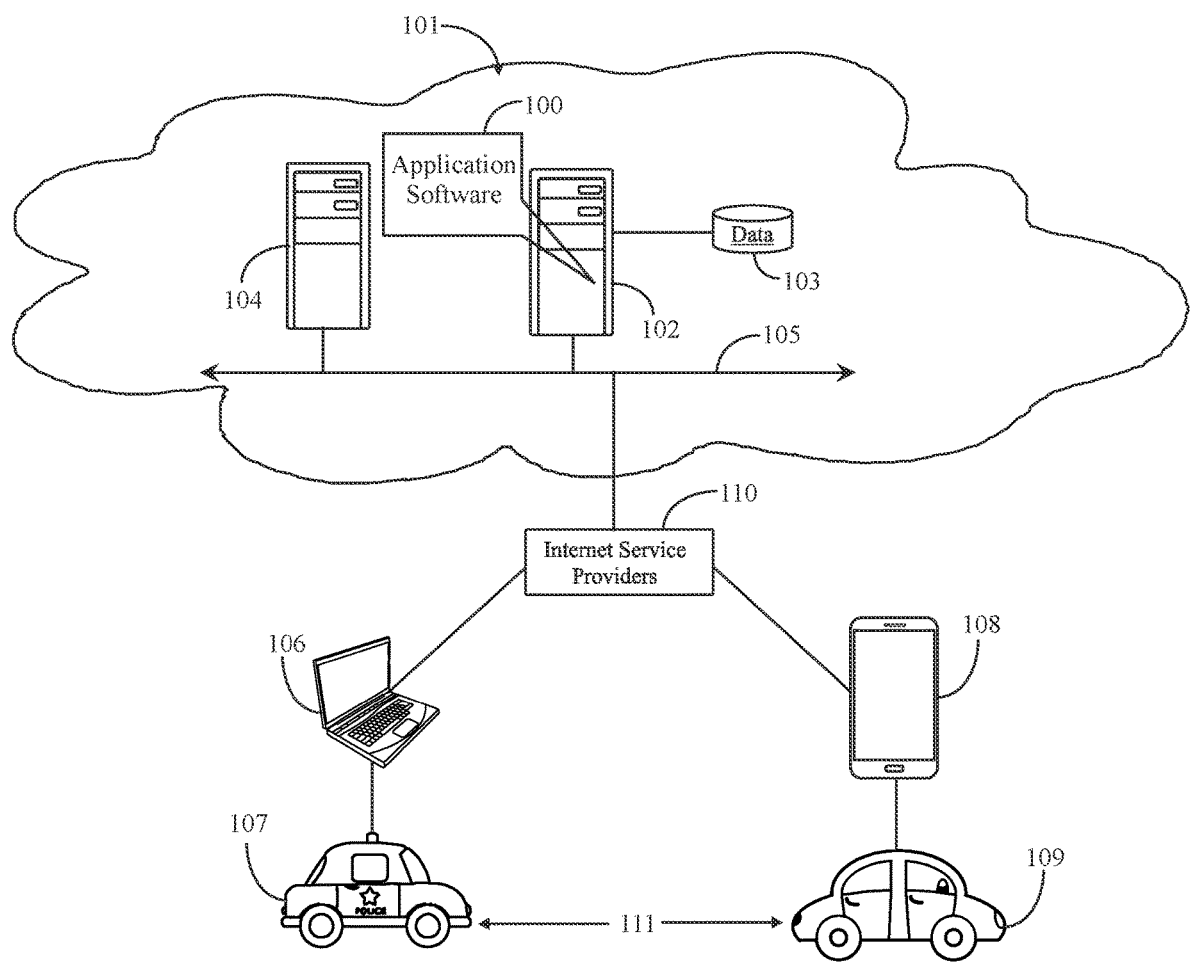
FIG. 1 is an architectural diagram of an Internet computer network system according to an embodiment of the present invention.

FIG. 1 is an architectural diagram of an Internet 101 computer network system according to an embodiment of the present invention. The Internet-connected system comprises one or more Internet-connected servers 102 executing application software 100 from non-transitory media. The application software has a mobile (herein "app") and web platform, which will be discussed in greater detail below. Server 102 is connected to a data repository 103, which may be any sort of data storage known in the art. The system further comprises a third party Internet-connected server 104 connected to Internet backbone 105. Although one third party Internet-connected server 104 is shown, it is understood that potentially millions of other similar servers are connected to the Internet via Internet backbone 105. A computing device 106 and mobile computing device 108 are connected to the Internet-connected server via an Internet service provider (ISP) 110 allowing the devices to access the application software. Computing device 106 is any computing device used by a patrol officer in a police car 107. The computing device may be defined as any computing device, mobile or otherwise used by the patrol officer during active duty. Likewise, mobile computing device 108 may be a smart phone used by a driver 109. Although a single patrol officer and driver are illustrated it is understood that any number officers and drivers may be connected to the application software, however their interactions are not connected and every interaction is independent from each other. For instance, for an interaction to occur, computing devices 106 and 108 have to be within a predetermined range 111, which is approximately 30 yards or less. The predetermined range allows for a suitable distance between the patrol officer and driver during a routine traffic stop. Routine traffic stops include but are not limited to speeding, blocking intersections, erratic driving, expired tags, seat belt, distractive driving, and broken taillights.

It is a particular advantage of the present invention to eliminate the physical interaction during a routine traffic stop. After a routine traffic stop is made, when the patrol officer and driver are in the predetermined range computing devices 106 and 108 may be parried. The parring technology may be any available wireless technology, not limited to Bluetooth. At the time of this disclosure, the preferred wireless technology is Bluetooth v5, however it is understood that as technology advances the system and method disclosed herein may utilize any advanced technologies without departing form the scope or spirit of the invention.

As previously mentioned, pairing two computer applications one web and the other a mobile device; will work in concert to transfer specific data points to identify a driver instantly from a distance. Eliminating the physical interaction during a routine traffic stop. The patrol officer's computing system 106 can only communicate and pair with the driver's mobile device only when it's within the pairing range; which is between 20-30 yards radius of the driver's vehicle. At this range and only this range, the communication between devices are connected. An alert is sent directly to the driver's computing device via mobile app informing that a patrol officer's system has detected a potential traffic infraction. The drivers' api displays "Please Pull Over to Safe Place and enter your Password" on the driver's computing device. The driver pulls over, and enters a password. Now the devices are paired and the app is fully activated.

Figure 2:
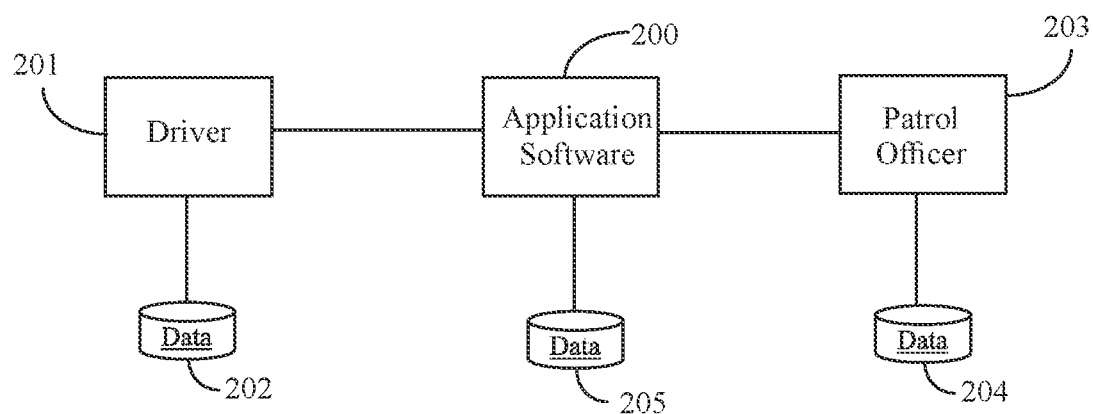
FIG. 2 is an architectural diagram of a network system according to an embodiment of the present invention.

FIG. 2 is an architectural diagram of a network system according to an embodiment of the present invention. In one embodiment, during a routine traffic stop according to the requirements previously mentioned, a patrol officer 203 has a non-physical interaction with a driver 201 via application software 200. To provide clear transparency of the interaction, data 202 and 204 on their respective computing devices are recorded and saved for the driver and patrol officer respectfully. Likewise, the application software creates a data blue print stored on data repository 205 of the interaction. Furthermore, the system provides cloud services for drivers and police officers to access the details of the interaction for future reference and/or in a case when the recorded data is lost or damaged on their computing device. It is a particular advantage of the present invention, that all interactions using the system are recorded for transparency and to avoid corruption, and abusive of power. This will be discussed in further detail below.

Figure 3:
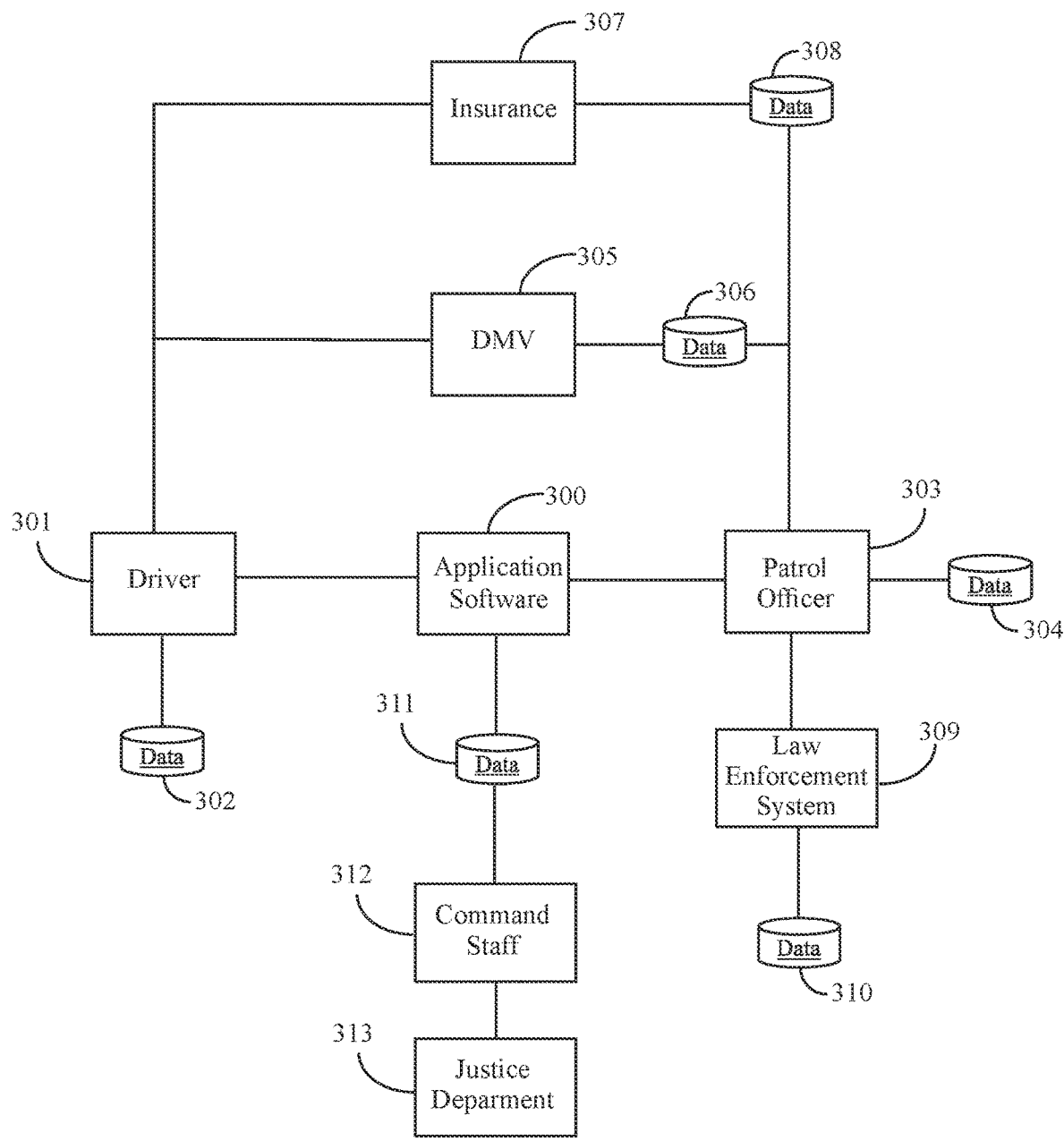
FIG. 3 is an architectural diagram of a network system according to an embodiment of the present invention.

FIG. 3 is an architectural diagram of a network system according to an embodiment of the present invention. In one embodiment, during a routine traffic stop according to the requirements previously mentioned, a patrol officer 303 has a non-physical interaction with a driver 301 via application software 300. Once the driver downloads the application software on their mobile computing device they may utilize the system by getting in compliance. The driver may get in compliance by entering a valid driver's license and proof of insurance via the mobile app's user interface. This information is verified by the Department of Motor Vehicles (DMV) 305 and Insurance Company 307 and their respective data sources 306 and 308 where the information is stored. If the driver does not have a valid driver's license, has a suspended license, or no insurance the application software will not download. In some embodiments, passports and International Driving Permits (IDP) may be used for identification purposes. This is a particular advantage of the present invention, as if a driver has the application software on their mobile computing device they are in compliance. Thus, when an interaction occurs during a routine traffic stop the driver's license number and proof of insurance of the driver is sent to the patrol officer. Likewise, the patrol officer's name and badge number are sent to the driver and are displayed on the app during the traffic stop. The patrol officer then accesses the Law Enforcement System 309 and its data 310 to verify the driver and access the information, including but not limited to name, address, date of birth (DOB), DMV photo, and driving records. Once the driver's information is verified, the patrol officer sends the reason for the traffic stop or infraction to the driver via the app. The patrol officer may also issue a ticket per the infraction via the app, wherein the driver receives the digital infraction/ticket on their mobile computing device via the app. The ticket is stamped with the location and violation time of the infraction, as well as the details of the infraction, i.e. speeding, texting while driving, talking on mobile device, erratic driving, no seatbelt, broken tail lights, etc. In one embodiment, the driver can track their speed during a stop via the application software for dispute purposes if needed.

Next, the driver has the option to agree (sign) or dispute the infraction using the user interface on their mobile computing device via the app. If the driver agrees, they have the option to pay the ticket immediately on their mobile computing device via the app, or pay on a later date. As well known in the art, the driver may dispute the infraction in the court of law. This concludes the traffic stop. The information and details of the stop are preserved and stored in data repositories 302, 304, 310, and 311. Data repository 302 includes both the hard drive of the mobile computing device as well as a secure database in the cloud in which the driver has access to a digital receipt of the infraction. Similarly, the interaction and details are stored on data repository 304 of the patrol officer and data repository 310 of the law enforcement system. Similarly, a copy of the interaction and details are stored in secured data storage 311 via the system. This data is available to the patrol officer's command staff 312 and the Justice Department 313.

The core embodiment of this invention consists of two versions; Driver Mode and Pedestrian Mode with a web version for Patrol Cars; complemented with a mobile version for Drivers and Pedestrians, supported by servers, data and cloud-based services to track and record instances when traffic infractions are perpetrated. The functionality of the app is for the sole purpose of identifying a driver from a distance. When downloaded on the Patrol Officer's computer system, the application has zero access to Law Enforcement servers, or data. It's completely independent from their system, but works in concert with their existing system to identify and verify the driver, issuance of tickets via the app and application api, and have a hard copy mailed to the address that's indicated on the driver's license. An intuitive interface also integrates the option to pay and process a ticket on-the-spot.

When paired with the mobile version, the two devices communicate specific data points complied from the DMV and dynamic person profile ID verification and routine traffic infractions processing purposes only. Routine traffic stops include but are not limited to speeding, blocking intersections, erratic driving, expired tags, seat belt, distractive driving, and broken taillights. To preserve the integrity of this method and system, it's intended for routine traffic stops; at this stage it's not intended for criminal purposes. This method applies to law abiding citizens that encounter traffic infractions.

The functionality will expose an officer if the power is abused by creating a data blue print of every interaction when the app is connected, accessed, and activated. In one embodiment, each download is supported with officer's name, badge number, and patrol unit number. Likewise, each download is time stamped. As previously mentioned, the Command Staffs and Justice Department will also have access to this sensitive data.

The mobile version downloaded from the driver must be in compliance with the requirements prior to downloading the app. In one embodiment, if a driver has a suspended license, they are not accepted into the system. The api will read "unable to complete the download". The inventive feature of this system, method, and app is eliminating the need for a Police Officer to have to exit his vehicle during a routine traffic stop. The purpose of the app is to identify a driver instantly from a distance between vehicles of 20-30 yard radius in order for this method and system to be properly executed. It's one of the requirements of being pre-vetted at the sign up stage after downloading. Creating a profile, including inputting a valid driver's license number and proof of insurance via the app.

For security purposes, a valid driver's license number will identify and reveal the complete DMV profile of the driver to the Police Officer when the devices are in pairing mode after a password has been entered that was created during the initial process. A two-step authentication process is required for a.) devices to connect during a routine traffic stop when the vehicles are within the said range indicated above; and b.) the systems are activated after a password has been entered, which then starts the ID verification process, which will show that the driver's license and proof of insurance are valid.

The improved method and system, eliminates having to exit a vehicle to obtain these documents and the entire process has been streamed lined and therefore, all included into the app. The app is totally independent of accessing any information from the drivers' device i.e. during the pairing process, while the Police Officer's system does not have any access to trace calls, see texts, or monitor that driver's computing device, and encryption technology will be implemented into the application to prevent any unauthorized access. It is a particular advantage of the present invention, that when pairing devices, there's a predetermined time limited allowed after the exchange of profiles are successful, which prevents profiling and unethical practices. The drivers' user interface captures the Police Officer's name and badge number during every interaction, and is stored on secure dedicated servers, also captured and time stamped are: location, time of day/night, recorded speed at the time of stop. The purpose of creating data profiles of Driver and Police Officer to access at later dates, if needed. Accountability and transparency is paramount. This keeps both parties honest. The implementation of a pre-vetted process, streamlines the verification of the Driver.

In one embodiment, the method and system can be applied to motorcyclists as well. Later model vehicles and motorcycles can be notified via an api integration between dashboard interfaces, and mobile devices. Multiple branches of Police Officers will benefit from the method and system in identifying drivers' implementing this system, Highway Patrol and State Troopers, each municipality will have the ability to utilize this technology on a wide spectrum, saving time by processing routine traffic infractions digitally.

Pedestrian Mode

Figure 4:
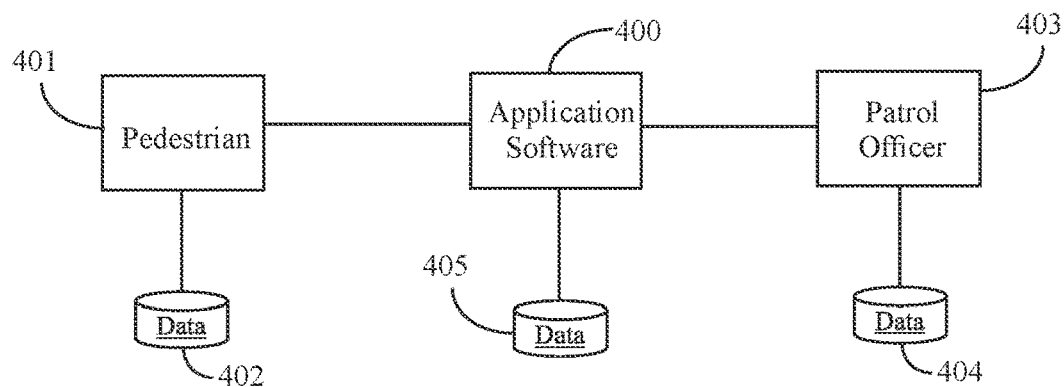
FIG. 4 is an architectural diagram of an alternative network system according to an embodiment of the present invention.
Figure 5:
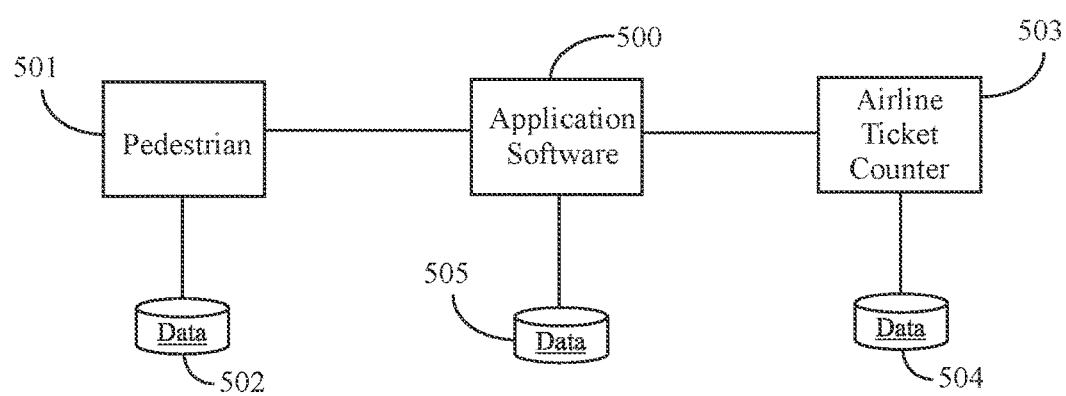
FIG. 5 is an architectural diagram of an alternative network system according to an embodiment of the present invention.
Figure 6:
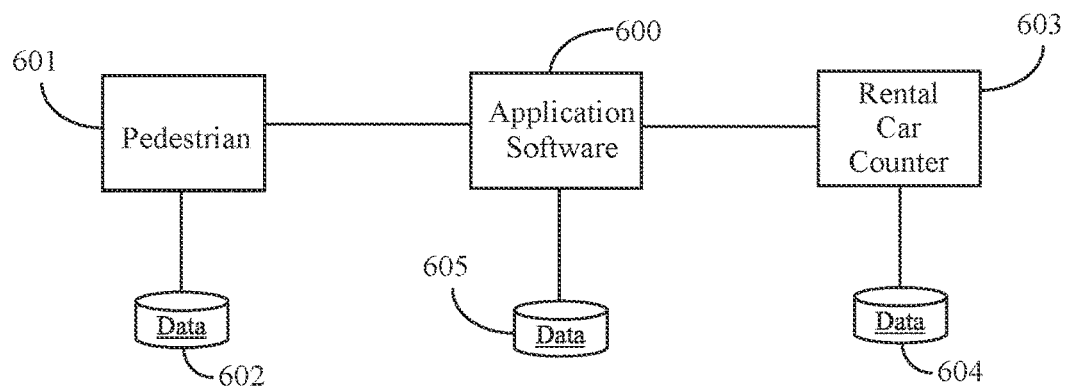
FIG. 6 is an architectural diagram of an alternative network system according to an embodiment of the present invention.

FIGS. 4-6 are architectural diagrams of alternative network systems for pedestrians according to an embodiment of the present invention. Pedestrian Mode counters the "Stop and Frisk Laws" that apply in New York for instance, and other high crime areas. Utilizing the invention to eliminate a stop and frisk potential victim of unethical abuse, the Police Officer and Transit Authorities can ID an individual from a distance prior to having to impose physical contact and humility by implementing the technology used to ID and verify drivers' as described above.

In many cases, in inner cities, individuals tend to take public transportation to get around, and having to walk the remainder to the way to arrive to a destination, and this results in some unfortunate situations. To solve this problem, one could apply this same method for non-drivers' by implementing the same requirements of being "pre-vetted" during the registration process. With no outstanding warrants, parolee, felons and registered sex offenders will NOT be allowed to download the software, due to the fact that they have search and seizure clauses attached to their profiles. This informs the Police Officer that there's no need to approach the individual. This effort alone will result in better Policing in communities in "high crime" areas. The end result in implementing this method exposes the real criminals without the guess work, due to the fact that they're denied access to download the software, because they simply don't qualify, based on the requirements. This method can expose the criminals, while police officers can now actually target (real criminals), rather than harass law abiding citizens.

Referring to FIG. 4, a patrol officer 403 has a non-physical interaction with a pedestrian 401 via application software 400. Similarly, to the driving mode discussed above, the pedestrian accesses the application software using a mobile computing device and the patrol officer accesses the application software using a computing device, such as a laptop provided in a squad car. To provide clear transparency of the interaction, data 402 and 404 on their respective computing devices are recorded and saved for the pedestrian and patrol officer respectfully. Likewise, the application software creates a data blue print stored on data repository 405 of the interaction. It is a particular advantage of the present invention, that all interactions using the system are recorded for transparency and to avoid corruption, and abusive of power. A pedestrian law enforcement stop is defined as a law enforcement stop where the pedestrian is not in a private vehicle. The law enforcement officer may be in a vehicle or on foot. The pedestrian may be on food or in a public vehicle or transportation method, such as public transportation.

As previously mentioned, the pedestrian mode is similar to the traffic stop version of the present invention discussed herein. The difference being that the Pedestrian version is utilized for non-driving instances. In situations accessing all forms public transportation i.e., Light Rail, Planes, Cruise lines, Airports, etc. In some embodiments, the method and system also is configured to eliminate the use of Fake ID's.

Facial Recognition in the application software 100 determines the positive identification of an individual during the process of determining who this person in question is during the law enforcement stop. The identification process adheres to the purposes of privacy the Facial recognition and after the stop or encounter, it is deleted and this information is never stored in any data repository. The sensitivity of this technology (FR) is not abused and/or exploited any form our technology simply deletes this aspect after every interaction instantly and automatically.

Advantageously, this technology assists in situations when Law Enforcement encounters an individual in highly suspected scenario and the individual is experiencing erratic behavior rather than assume the worst. Law Enforcement now can be provided the tools to rigorously evaluate and de-escalate the situation utilizing the technology.

Mental illness is a major issue and rightly so, the misconceptions and the ability to recognize and detect it in Law Enforcement can be the determining factor of life or death situations. Being equip with the proper tools can help mitigate the risks involved with the proper approach. Applying real time facial recognition can determine the mental state of individuals not as a clinical conclusion, but yet an alert to Law Enforcement to notify qualified mental health staff on the scene which helps dramatically in the de-escalation of potential volatile situation. In one embodiment, the application software 100 will be connected to mental health services databases for the sole purpose of logging data on such individuals per future use.

Referring to FIG. 5, the method and system can also be applied to Airport Ticket Counters 503, the most advantageous use of this invention, having the ability to ID and verify Pedestrians 501 via application software 500. This mode functions in the same manner as Driver Mode, the technology can be integrated into Airline ticket counter computer systems to verify passengers, also airport security cameras, TSA can all benefit from this method and system to verify passengers. Similarly to the method described above, data 502 and 504 on the computing devices for the pedestrian and Airline Ticket Counter System are recorded and saved to make a record of the ID verification interaction. Likewise, the application software creates a data blue print stored on data repository 505 of the interaction.

In an alternate embodiment of the present invention, the method and system can be utilized to streamline the rental car ID verification process. Renting a car can be a time consuming and frustrating event, often comprising long lines with tired travelers. Referring now to FIG. 6, using the system and method described, a rental car counter 603 can utilize application software 600 to verify a pedestrian 601 including but not limited to their ID, driver's license, and in some cases proof of insurance. Similarly to the method described above, data 602 and 604 on the computing devices for the pedestrian and rental car counter system are recorded and saved to make a record of the ID verification interaction, and may include other information including but not limited to a rental car agreement. Likewise, the application software creates a data blue print stored on data repository 605 of the interaction.

In some embodiments, multiple devices having the software downloaded may be present during a single interaction. Thus, to differentiate and navigate between devices say for instance, during a routine traffic stop and there are multiple passengers in a vehicle, it's a matter of entering a password to initiate device pairing and transferring of data profiles, between the Police Officer and the actual Driver. In some embodiments, during non-driving situations, if multiple devices are recognized on public transportation in pedestrian mode, the same method and process applies per verification and identifications purposes.

Issuance of tickets, in this instance, all the requirements are predetermined and validated in advance; it's imperative that all drivers and pedestrians keep their profiles and information up-to-date and current, the mobile app will alert them if there are any changes on their profile pertaining to driving privileges, infractions, or proof of insurance status etc.

It is a particular advantage of the present invention that tickets can be processed via the application and the hard copy is mailed directly to the address associated with your DMV profile.

The complete process is executed from distance between the officer and driver in less than 15 minutes at distance of 20-30 yards and the entire process has a digital blue print of the traffic stop, the officers profile, and the number of times he has pulled over a driver for traffic violations, which is all recorded and stored on secure servers for future references. The driver will have the option of paying and processing a ticket on-the-spot, via the app, or the option to pay at a designated later date. If the driver disputes an infraction, they can rectify the issue in court.

Implementing this method and system of 21$^{st}$ Century Law Enforcement will ensure accountability and transparency along with safety for Law Enforcement and Communities.

Method Steps:
a) Download the web version software to Law Enforcement computers systems
b) Integrate the web version software to communicate with Law Enforcement and DMV systems. (Nationwide)
c) Link software to Patrol Cars and Police Motor Cycle Units
d) Each Patrol Officer creates a profile to access software
e) The system then tracks and records all activities during a shift
f) Access secure servers' data bases and cloud-related systems, the public has no access.
g) Driver downloads the mobile version via app stores
h) Multiple platforms IOS Android and Windows
i) Driver enters Drivers Lic. Number and Proof of Insurance via the API
j) The Driver has access to data via separate servers, data bases, cloud related services.
k) The Driver must be in compliance to download app
l) Suspended License? or Parolee app will not download
m) Driver then has the option to download the Pedestrian version of the app
n) After indicating which version to download
o) The application indicates: In Compliance download is completed.
p) Patrol Officer notices an infraction being perpetrated
q) He then hits the lights indicating to Driver to pull over
r) The Drivers app also sends an alert and displays "please pull over to a safe place"
s) The two devices start the pairing process
t) When within a radius of 20-30 yards' proximity
u) The Driver then must enter a password via the api
v) A two-step authentication process is baked into app per security purposes.
w) The communication between the app and Police Officer systems has started. Driver and Police apps exchanges information.
x) The Driver's app displays his/her Driver's Lic. Number and Proof of Insurance.
y) The Police Officer's Name and Badge Number also are displayed on Driver's app during the stop.
z) The Police Officer's computer system receives the Driver's preset profile.
aa) The Police Officer then accesses Law Enforcement system to verify the Driver.
bb) The Police Officer computer system then displays the Driver's full profile: Name, Address, D.O.B. DMV photo and driving record.
cc) This all takes place from a distance of 20-30 yards between the two vehicles.
dd) The Police Officers separate data base from the public then sends the results of the verification findings, which are in compliance.

ee) The Officer then tells the Driver why he has been pulled over via the app i.e. speeding, no seatbelt, talking on device while driving, erratic driving, broken tail lights etc.
ff) Police Officer now issues a ticket per infraction, all via the app and api.
gg) The Driver can now receive this digital infraction/ticket on his/her device.
hh) Ticket is time stamped with location, violation time and speed.
ii) Drivers app can also track speed during a stop, for dispute purposes if needed.
jj) Officer then sends the infraction via the app to Driver
kk) Driver has the option to agree or dispute the infraction via the app.
ll) If Driver agrees, they will have the option to pay the ticket on-the-spot, via the mobile device, or pay on a later date.
mm) If Driver disagrees, they also have the option to dispute in court.
nn) The Driver then signs the digital ticket via the app.
oo) Utilizing separate databases and servers
pp) The information and the actual stop has been preserved and stored on both systems for future reference points.
qq) A copy is stored on Law Enforcement Servers and Data Bases
rr) A copy is also stored on secured servers and databases for Drivers to access as a digital receipt of the infraction.
ss) Both servers can then be access by The Department of Justice
tt) To prevent unethical practices, during the pairing of devices
uu) Police Officers have zero access to the Driver's phone calls or text messages, photos, emails etc.
vv) When the stop has completed, the pairing of the devices can no longer communicate with each other.
ww) This prevents unethical practices from Police Officers
xx) Driver must initiate the two-step authentication process in order for the exchange of information with Law Enforcement to fully occur.
yy) The initial pairing of the device recognizes a Police Officers' device that within the range of 20-30 yds.
zz) Driver must then enter a unique password after the initial stage of pairing
aaa) At this stage the app is fully communicating and revealing ID and Proof of Insurance.
bbb) The exchange of information between Officer and Driver are now fully engaged.
ccc) Police Officer now accesses the Law Enforcement servers and data base, based on the Drivers Lic. Number and Proof of Insurance.
ddd) Pedestrians can download this version via the app stores
eee) Pedestrian enters DMV ID Number only via api
fff) Police Officers can reference Law Enforcement and DMV data base and servers to verify a Pedestrian
ggg) Pedestrians must be in compliance prior to download
hhh) Compliance means no active Warrants
iii) Felons, Parolee's, and Registered Sex Offenders cannot download the app.
jjj) Pedestrians can be identified from a distance
kkk) Police Officers software recognizes both applications
lll) Transit Authorizes can utilize technology to ID individuals.
mmm) The actual communication during stop is time sensitive for privacy purposes.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

Per forensic verification purposes during the routine traffic stops, embodiments of this invention also include the functionalities which sends instant photo of driver to officer via the phone device. The Driver simply takes a "proof-of-life" photo (selfie) which indicates the current time and date stamp for instant verification for Police Officer to reference the photo with the DMV photo that already exists on Law Enforcement data base and computer systems. This will enable Law Enforcement to verify Driver without ever existing the vehicle.

What is claimed is:

1. A system for increasing safety during pedestrian law enforcement stops comprising:
    a user application configured to be accessible by a smartphone, the application providing an authorization process to utilize the user application, wherein the authorization process includes verifying a user does not have an outstanding warrant; a law enforcement application providing police officers the ability to communicate to the user application; and,
    wherein the combination of the user application and the law enforcement application enables a routine pedestrian law enforcement stop to occur with no physical interaction between a law officer having the law enforcement application and a pedestrian having the user application, wherein the pedestrian is on foot or using public transportation.

2. The system of claim 1, wherein the law enforcement application is configured to pair with the user application when the pedestrian having the user application is within a predetermined proximity.

3. The system of claim 2, wherein the predetermined proximity is 30-50 yards.

4. The system of claim 1, wherein the police office may issue citations via the user application from the law enforcement application.

5. The system of claim 4, wherein the user may pay a ticket or citation via the user application.

6. The system of claim 1, wherein during the routine law enforcement stop, the user application is configured require a two-step authentication process comprises a request for a unique password via the user application, and requiring a selfie photo taken of the pedestrian to verify identity.

7. The system of claim 1, access to the user application and the law enforcement application is only possible within the predetermined proximity, otherwise access to the user application and the law enforcement application is denied.

* * * * *